US012051028B1

(12) United States Patent
Gurney et al.

(10) Patent No.: US 12,051,028 B1
(45) Date of Patent: Jul. 30, 2024

(54) SYSTEMS AND METHODS FOR MODELING FLOW OF RESOURCES IN A SUPPLY CHAIN

(71) Applicants: Arizona Board of Regents acting for and on behalf of Northern Arizona University, Flagstaff, AZ (US); Arizona Board of Regents acting for and on behalf of Arizona State University, Tempe, AZ (US)

(72) Inventors: Kevin Gurney, Flagstaff, AZ (US); Deborah Huntzinger, Flagstaff, AZ (US); Taha Moiz, Tempe, AZ (US); Nathan Parker, Tempe, AZ (US); Richard Rushforth, Flagstaff, AZ (US); Benjamin L. Ruddell, Flagstaff, AZ (US)

(73) Assignees: Arizona Board of Regents Acting For and on Behalf of North Arizona University, Tempe, AZ (US); Arizona State University, Flagstaff, AZ (US)

( * ) Notice: Subject to any disclaimer, the term of this patent is extended or adjusted under 35 U.S.C. 154(b) by 29 days.

(21) Appl. No.: 18/058,848

(22) Filed: Nov. 25, 2022

Related U.S. Application Data

(60) Provisional application No. 63/264,579, filed on Nov. 24, 2021.

(51) Int. Cl.
*G06Q 10/08* (2024.01)
*G06Q 10/047* (2023.01)

(52) U.S. Cl.
CPC ........... *G06Q 10/08* (2013.01); *G06Q 10/047* (2013.01)

(58) Field of Classification Search
CPC ....... G06Q 10/0833; G06Q 10/063114; G06Q 10/087
USPC ........................................................ 705/333
See application file for complete search history.

(56) References Cited

U.S. PATENT DOCUMENTS

| | | | |
|---|---|---|---|
| 11,429,927 B1* | 8/2022 | Melancon | G06Q 10/06313 |
| 2020/0111033 A1* | 4/2020 | Mahajan | G06Q 10/04 |
| 2020/0118074 A1* | 4/2020 | Natarajan | G06Q 10/087 |
| 2022/0398528 A1* | 12/2022 | Gupta | G06Q 10/06315 |
| 2022/0405775 A1* | 12/2022 | Siebel | G06Q 30/0201 |

OTHER PUBLICATIONS

"On the relationship between supply chain and transportation network equilibria: A supernetwork equivalence with computations" Published by Elsevier (Year: 2006).*

* cited by examiner

*Primary Examiner* — Zeina Elchanti
(74) *Attorney, Agent, or Firm* — IPTechLaw

(57) ABSTRACT

Implementations of a method of modeling a flow of resources may include generating a stage resource database when the resources reach one or more stages from one or more supply nodes. The method may also include using a mass balance module to maintain an outflow less than or equal to a supply at the one or more supply nodes and an inflow greater than or equal to demand at the one or more stages. The method may include enforcing movement of resources to or from one or more supply nodes of the supply chain to the one or more stages. The method may include using a non-negativity constraint module to maintain a non-negative amount to be transported. The method may also include using a flow generation module and one or more constraint thresholds to report to a user the flow of the resources using one or more computer interfaces.

20 Claims, 11 Drawing Sheets

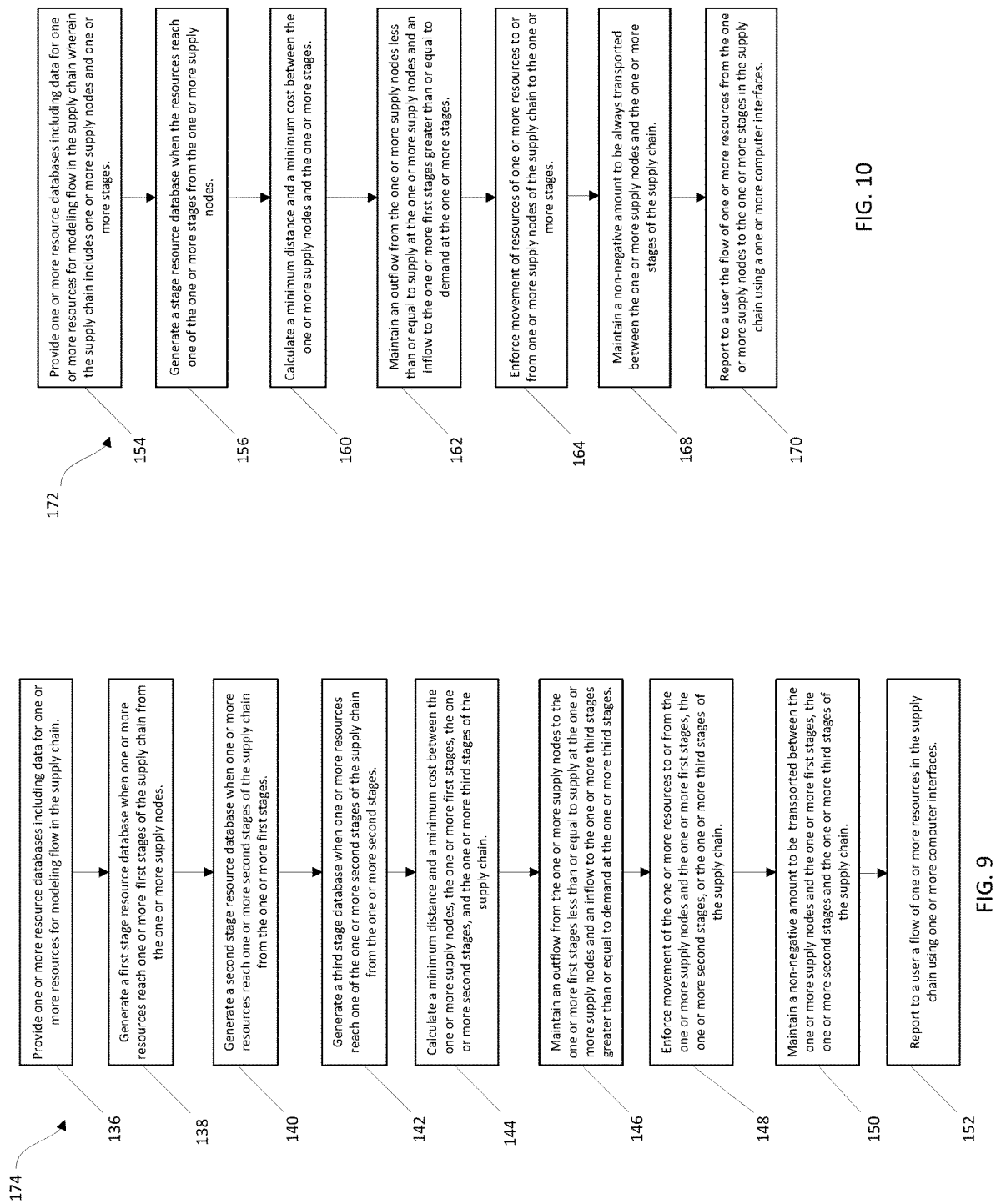

SYSTEMS AND METHODS FOR MODELING FLOW OF RESOURCES IN A SUPPLY CHAIN

CROSS REFERENCE TO RELATED APPLICATIONS

This document claims the benefit of the filing date of U.S. Provisional Patent Application Ser. No. 63/264,579, entitled "Gasoline Flow Modeling Systems and Related Methods" to Gurney et al. which was filed on Nov. 24, 2021, the disclosure of which is hereby incorporated entirely herein by reference.

GOVERNMENT LICENSE RIGHTS

This invention was made with government support under National Science Foundation Award 1639529. The government has certain rights in the invention.

BACKGROUND

1. Technical Field

Aspects of this document relate generally to systems and methods, such as systems and methods for modeling flow of resources in a supply chain. More specific implementations involve modeling flow of resources in a supply chain and providing a user interface.

2. Background

Supply chains provide a network describing how resources move from a source to delivery for consumption by the end user. Supply chains also involve the components involved in production and transportation of the commodities being moved in the supply chain.

SUMMARY

Implementations of a method of modeling a flow of one or more resources in a supply chain may include providing one or more resource databases including data for one or more resources for modeling flow in a supply chain wherein the supply chain includes one or more supply nodes, one or more first stages, one or more second stages, and one or more third stages. The method may also include generating a first stage resource database when one of the one or more resources reaches one of the one or more first stages of the supply chain from the one or more supply nodes. The method may also include generating a second stage resource database when of the one or more resources reaches one of the one or more second stages of the supply chain from the one or more first stages. The method may also includes generating a third stage database when one of the one or more resources reaches one of the one or more third stages of the supply chain from the one or more second stages. The method may also include using a transportation network module and the one or more resource databases to calculate minimum distance and a minimum cost between the one or more supply nodes, the one or more stages, the one or more second stages, and the one or more third stages of the supply chain. The method may also include using a mass balance module and the one or more resource database to maintain an outflow from the one or more supply nodes to the one or more first stages less than or equal to a supply at the one or more supply nodes and an inflow to the one or more third stages greater than or equal to demand at the one or more third stages. The method may include using a movement control module and the one or more resource database to enforce movement of the one or more resources to or from the one or more supply nodes and the one or more first stages, the one or more second stages, or the one or more third stages of the supply chain. The method may also include using a non-negatively constraint module and the one or more resources databases to maintain a non-negative amount to be transported between the one or more supply nodes and the one or more first stages, the one or more second stages, and the one or more third stages of the supply chain. The method may also include using a flow generation module and one or more constraint thresholds to report to a user a flow of the one or more resources in the supply chain using one or more computer interfaces generated by a computing device associated with the users.

Implementations of a method of modeling a flow of one or more resources in a supply chain may include one, all, or any of the following:

A state of the one or more resources in the first stage may be different from a state of the one or more resources in the second stage or in the third stage.

The one or more constraint thresholds may include one of a non-negativity constraint threshold, an outflow constraint threshold, a type of transportation constraint threshold, a minimum distance constraint threshold between supply and demand, a transportation cost threshold, or any combination thereof.

The movement control module may generate a type of transportation constraint threshold.

The one or more constraint thresholds are binding constraints.

The one or more constraint thresholds may be generated by the movement control module and the one or more constraint thresholds generated by the movement control module may include a tolerance of one of ±0.001%, ±1%, ±5%, ±10%, or ±20%.

Implementations of a method of modeling a flow of one or more resources in a supply chain may include providing one or more resource databases including data for one or more resources for modeling flow in the supply chain where the supply chain includes one or more supply nodes and one or more stages. The method may include generating a stage resource database when the one or more resources reach one of the one or more stages from the one or more supply nodes and, using a transportation network module and the one or more resource databases, calculating a minimum distance and a minimum cost between the one or more supply nodes and the one or more stages. The method may also include using a mass balance module and the one or more resource databases to maintain an outflow from the one or more supply nodes less than or equal to a supply at the one or more supply nodes and an inflow to the one or more stages greater than or equal to demand at the one or more stages. The method may include using a movement control module and the one or more resource databases to enforce movement of the one or more resources to or from one or more supply nodes of the supply chain to the one or more stages. The method may include using a non-negativity constraint module and the one or more resource databases to maintain a non-negative amount to be transported between the one or more supply nodes and the one or more stages of the supply chain. The method may also include using a flow generation module and the one or more constraint thresholds to report to a user the flow of the one or more resources from the one or more supply nodes to the one or more stages in the supply chain using one or more computer interfaces generated by a computing device associated with the user.

Implementations of a method of modeling the flow of one or more resources in a supply chain may include one, all, or any of the following:

A state of the one or more resources in the one or more stages may be different from a state in at least one of the one or more stages.

The one or more constrain thresholds may include a non-negativity constraint threshold, an outflow constraint threshold, a type of transportation constraint threshold, a minimum distance constraint threshold between supply and demand, a transportation cost threshold, or any combination thereof.

The movement control module may generate a type of transportation constraint threshold.

The one or more constraint thresholds may be binding constraints.

The one or more constraint thresholds may be generated by the movement control module and the one or more constraint thresholds generated by the movement control module may include a tolerance of ±0.001%, ±1%, ±5%, ±10%, or ±20%.

Implementations of a system for modeling a flow of one or more resources in a supply chain may include one or more processors configured to execute a transportation network module and one or more resource databases configured to calculate a minimum distance and a minimum cost between one or more supply nodes and one or more first stages of a supply chain. The system may include a mass balance module configured to maintain an outflow from the one or more first stages less than or equal to a supply available at the one or more first stages and an inflow to one or more second stages greater than or equal to demand at the one or more second stages. The system may include a movement control module configured to enforce movement of resources to or from the one or more supply nodes to the one or more first stages and a non-negativity constraint module configured to maintain a non-negative volume to be transported between the one or more supply nodes and the one or more first stages of the supply chain. The system may also include a flow generated module and one or more constraint thresholds configured to report to a user the flow of one or more resources and emissions from the flow of the one or more resources in the supply chain using one or more computer interfaces generated by a computing device associated with a user.

Implementations of a system for modeling a flow of one or more resources in a supply chain may include one, all, or any of the following:

A state of the one or more resources in the one or more first stages may be different than a state of the one or more resources in the one or more second stages.

The one or more constraint thresholds may include a non-negativity constraint threshold, an outflow constraint threshold, a type of transportation constraint threshold, a minimum distance constraint threshold between supply and demand, a transportation cost threshold, and any combination thereof.

The movement control module may generate a type of transportation constraint threshold.

The one or more constraint thresholds may be binding constraints.

The movement control module may generate one or more constraint thresholds with a tolerance of ±0.001%, ±1%, ±5%, ±10%, or ±20%.

The flow generation module may report emissions from transporting the one or more resources along each of the one or more first stages and each of the one or more second stages and the emissions from a specific amount of the one or more resources when the one or more resources are transformed at the one or more first stages, the one or more second stages or both the one or more first stages and the one or more second stages.

The flow generation module may report emissions from the one or more first stages, the one or more second stages, and the one or more third stages of the supply chain.

Implementations of a method of modeling a flow of resources in a supply chain may include generating one or more first stage resource databases using a supply node resource database configured to model the resource flow in a supply chain where the supply chain includes one or more first stages and one or more second stages. The method may include generating one or more second stage resource databases when one or more resources reach the one or more second stages and, using a transportation network module, the one or more first stage resource databases, and the one or more second stage resource databases, calculating a minimum distance and a minimum cost between the one or more first stages and the one or more second stages. The method may include using a mass balance module, the one or more first stage resource databases, and the one or more second stage resource databases, maintaining an outflow from the one or more first stages less than or equal to a supply at the one or more first stages and an inflow to the one or more second stages greater than or equal to demand at the one or more second stages. The method may also include moving a movement control module, the one or more first stage resource databases, and the one or more second stage resource databases to enforce movement of resources to or from the one or more first stages to the one or more second stages. The method may also include using a non-negativity constraint module, the one or more first stage resource databases, and the one or more second stage resource databases to maintain a non-negative volume to be transported between the one or more first stages and the one or more second stages. The method may also include using a flow generation module and one or more constraint modules to report to a user the flow of the one or resources from the one or more first stages in the supply chain to the one or more second stages using one or more computer interfaces.

Implementations of a method of modeling a flow of one or more resources and emissions from a flow of resources in a supply chain may include providing a first stage resource emission database associated with a volume of a resource in a first stage of a supply chain, providing a third stage resource emission database associated with a volume of a resource in a third stage of the supply chain, and, using a demand calculating module, generating a demand resource database. The method may include using an emission production module, generating an emission database for the resource moved from one or more supply nodes to the first stage, to a second stage, and to the third stage. The method may also include using a carbon intensity calculation module to generate a carbon intensity database for the resource flow from the one or more supply nodes to the third stage. The method may also include using a flow generation module and the constraint threshold to report to a user the emissions from the flow of the resource in the supply chain using one or more computer interfaces.

The foregoing and other aspects, features, and advantages will be apparent to those artisans of ordinary skill in the art from the DESCRIPTION and DRAWINGS, and from the CLAIMS.

BRIEF DESCRIPTION OF THE DRAWINGS

Implementations will hereinafter be described in conjunction with the appended drawings, where like designations denote like elements, and:

FIG. 9 is a flow diagram of an implementation of a method of enabling modeling a flow of resources in one or more first stages, one or more second stages, and one or more third stages in a supply chain;

FIG. 10 is a flow diagram of an implementation of a method of enabling modeling a flow of resources in one or more stages in a supply chain;

DESCRIPTION

Figure 1:
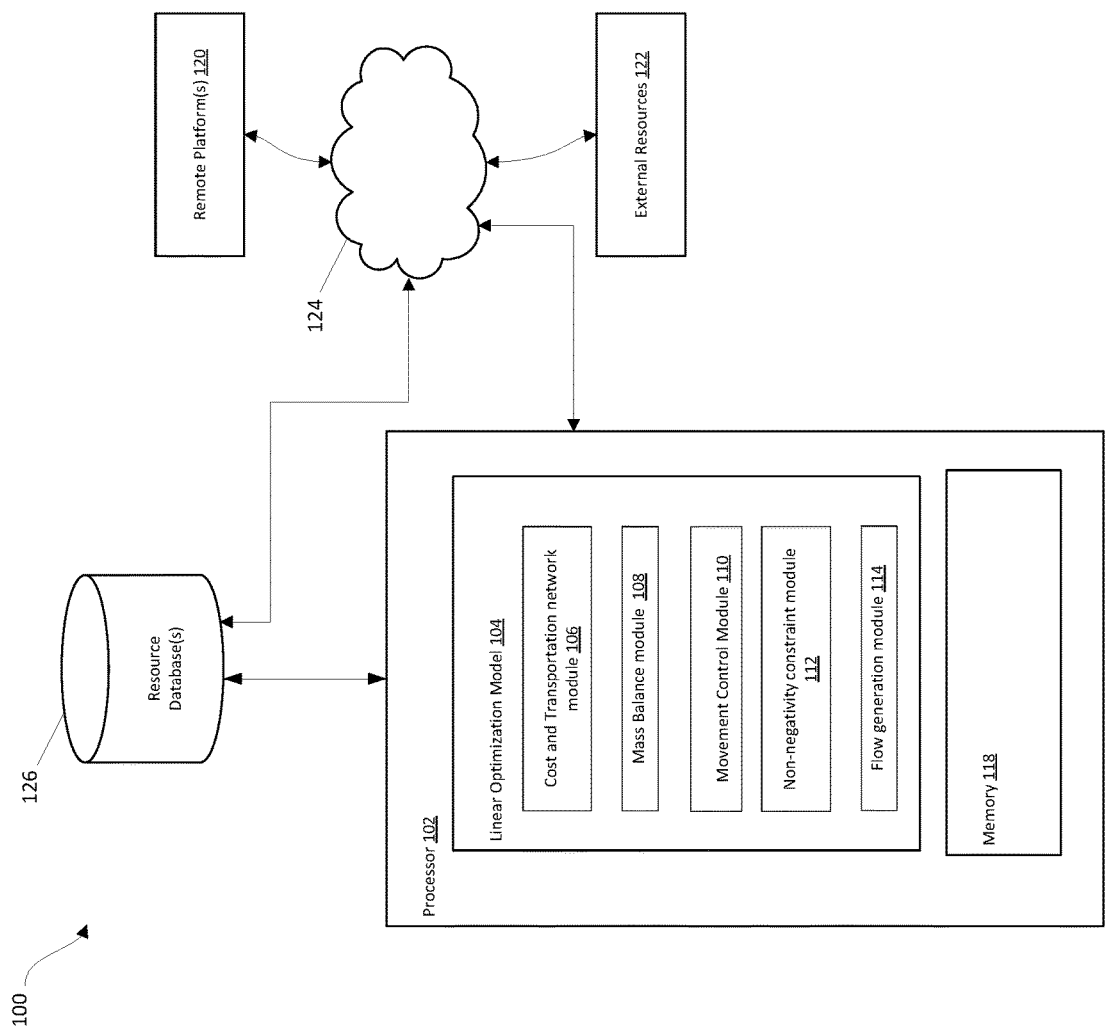
FIG. 1 is a block diagram of various modules of an implementation of a system for enabling modeling of flow of resources in a supply chain.

This disclosure, its aspects and implementations, are not limited to the specific components, assembly procedures or method elements disclosed herein. Many additional components, assembly procedures and/or method elements known in the art consistent with the intended systems and methods for modeling a flow of one or more resources in a supply chain will become apparent for use with particular implementations from this disclosure. Accordingly, for example, although particular implementations are disclosed, such implementations and implementing components may comprise any shape, size, style, type, model, version, measurement, concentration, material, quantity, method element, step, and/or the like as is known in the art for such modeling a flow of one or more resources in a supply chain, and implementing components and methods, consistent with the intended operation and methods.

Implementations of resource flow modeling methods and systems disclosed herein are used to calculate flow of resources within a specific geographic area and also track the movement of resources from source(s) to intermediate stages to the end user(s) via multiple infrastructure networks such as, by non-limiting example, pipelines, tankers, trains, and trucks. Particular implementations also include the capability to generate various displays of resource flows within a geographic area on computer interfaces on a computing device associated with a user.

Implementation of systems and methods for modeling a flow of one or more resources in a supply chain disclosed herein utilize a linear optimization model to estimate the supply and demand of resources and a balanced amount of flow of resources from a source through consumption of the resources. When the quantities of resources are moved across the country, the exact quantities of resources moved between a source, intermediate stages and stage of consumption, as well as the mode of transportation are not known with certainty. The linear optimization model is used to model those links in the supply chain with constraints related to total supply and demand at lower spatial resolutions, such as, by non-limiting example, state-level, district level, county level, metropolitan area level, or any other desired geographic area. The linear optimization model is based on linear programming that is used in Life Cycle Assessments (LCAs) for allocation of resources in multiple output systems and for evaluating the environmental and socio-economic optimum of the systems. A linear optimization model is used because it accounts for actual constraints in a system and provides an estimate based on those constraints thereby enables better understanding of the complex resource supply chain which has significant implications for local policy (as well as for private sector investment). The systems and method for modeling a flow of one or more resources in a supply chain may enable users to lay a foundation for modeling the evolution of resource supply chain using its actual dependencies, critical linkages, and pinch points identified using the full extent of available public data.

FIG. 1 illustrates an implementation of system for modeling the flow of resources in a supply chain 100 that includes a computing platform. The computing platform(s) may be configured to communicate with one or more remote platform(s) according to a client server architecture, a peer-to-peer architecture, and/or other architectures. Users may access the system 100 via remote platform(s) 120 including external resources 122 that may include computing devices associated with the users. Computing platforms may be configured by a linear optimization/programming model (LP model) including machine readable instructions. The linear optimization model may include one or more cost and transportation network modules 106, one or more mass balance modules 108, one or more movement control modules 110, one or more non-negativity constraint modules 114, and one or more flow generation modules 114. The various modules are implemented by a processor 102 included in the system 100 that is operatively coupled with a memory 118 and coupled with a resource database 126.

Figure 2:
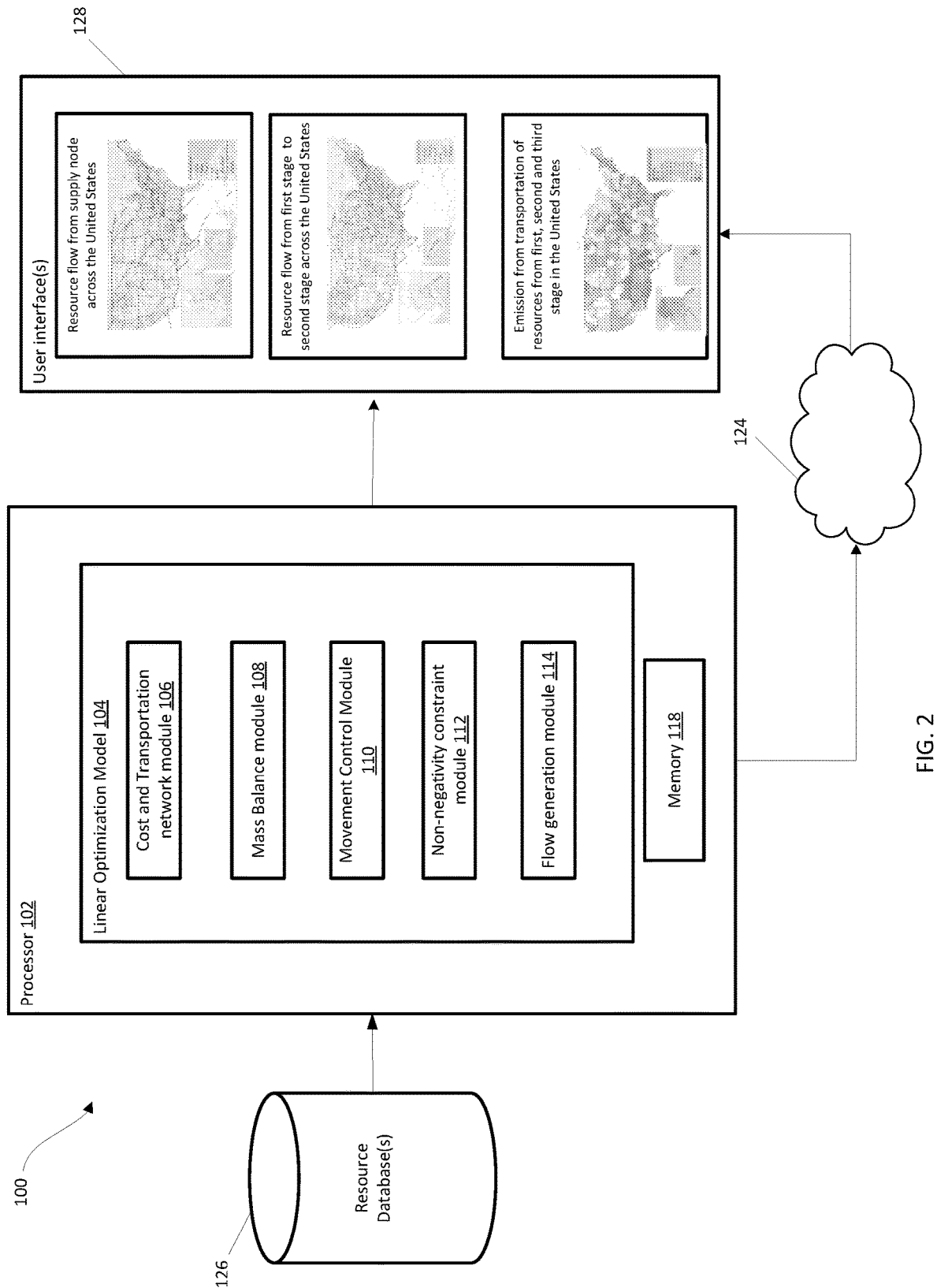
FIG. 2 is a block diagram of an implementation of a system for enabling modeling flow of resources in a supply chain and user interfaces for visualizing the flow of resources in a supply chain.

Referring to FIG. 2, another block diagram of the implementation of a system 1001 for modeling the flow of resources in a supply chain including a one or more user interface(s) 128 is illustrated. The implementations of the one or more user interface(s) 128 illustrated in FIG. 2 display optimum routes that are shorter, cost effective and/or satisfy one or more optimum and required conditions for flow of one or more resources in a supply chain. These interfaces may be generated by the processor 102 and the linear optimization model 104 or may be generated by a computing device associated with the user in various implementations. The one or more user interface(s) 128 are designed to report the optimum route(s) modeled by the linear optimization model 104 using one or more different modules.

Figure 3:
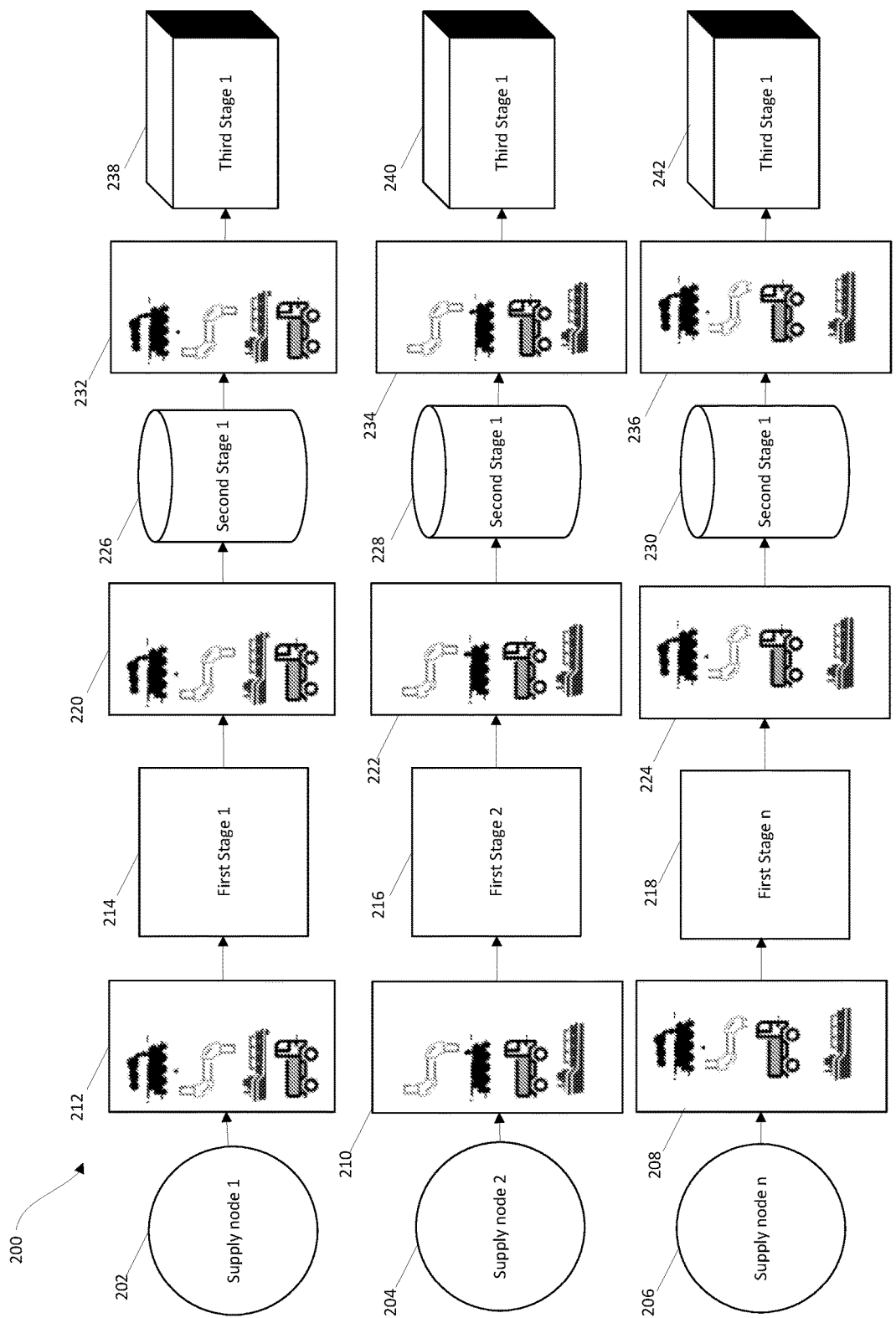
FIG. 3 is a block diagram of an implementation of a supply chain for the flow of resources.

Referring to FIG. 3, a block diagram of implementation of a supply chain 200 for one or more resources is illustrated. The supply chain in FIG. 3 illustrates a flow of resources from production to consumption of the one or more resources. Most of the resources produced at supply nodes 202, 204, 206 and transported across the geographic area may be one or more unfinished resources. These unfinished resources may include, by non-limiting example, one or more raw resources, one or more semi-finished resources, or one or more crude resources. Some of the resources produced at the supply nodes 202, 204, 206 may be produced geographically close to the one or more finished forms of the resources. The finished form of various resources may also include resources that are not in crude form or require no further modification during flow in of the supply chain 200. Referring to FIG. 3 again, the supply chain 200 is divided into supply nodes 202, 204, 206, first stages 214, 216, 218, second stages 226, 228, 230 and third stages 238, 240, 242. While three of the various nodes and stages are illustrated in FIG. 3, the supply chain may also include one node, one first stage, one second stage, and one third stage in various implementations. In other implementations, any combination of numbers of supply notes, first stages, second stages, and third stages may be employed. In each of the stages, the one or more resources moving through the stages may be in crude, raw, unfinished or finished form. The implementation of the supply chain illustrated in FIG. 3 also illustrates different modes of transportation 212, 220, 236 being used between each node and stage used. The resources may be transported using, by non-limiting example, trucks, vehicles, pipelines, tanker trucks, barges, ships, aircraft, rail, and/or any combination thereof or any other transportation mode capable of transporting a particular resource.

The unfinished resources may be modified to one or more finished form by combining them with other components or resources in different stages of the supply chain 200. The finished form of the resources from the one or more supply nodes 202, 204, 206 may undergo modifications in transit to different stages of the supply chain 200. The resources may be modified upon reaching one or more first stages 214, 216, 218 or one or more second stages 226, 228, 230 of the supply chain 200. The one or more finished form of the resources are then supplied for consumption by the end user in one or more third stages 238, 240, 242 of the supply chain 200.

Figure 4:
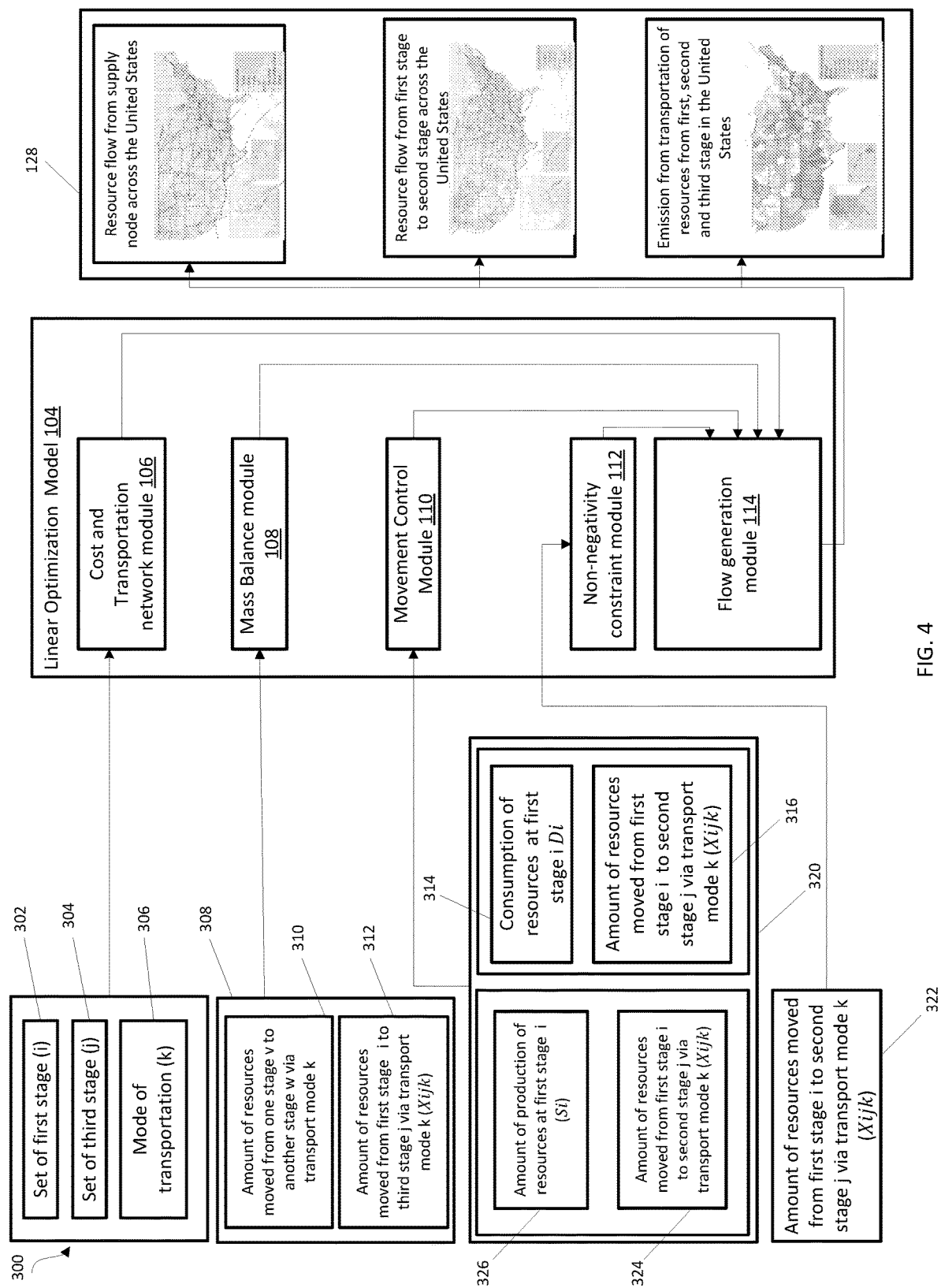
FIG. 4 is a block diagram of an implementation of a system for enabling modeling flow of resources in a supply chain using a linear optimization model and a plurality of modules used in the linear optimization model.
Figure 5:
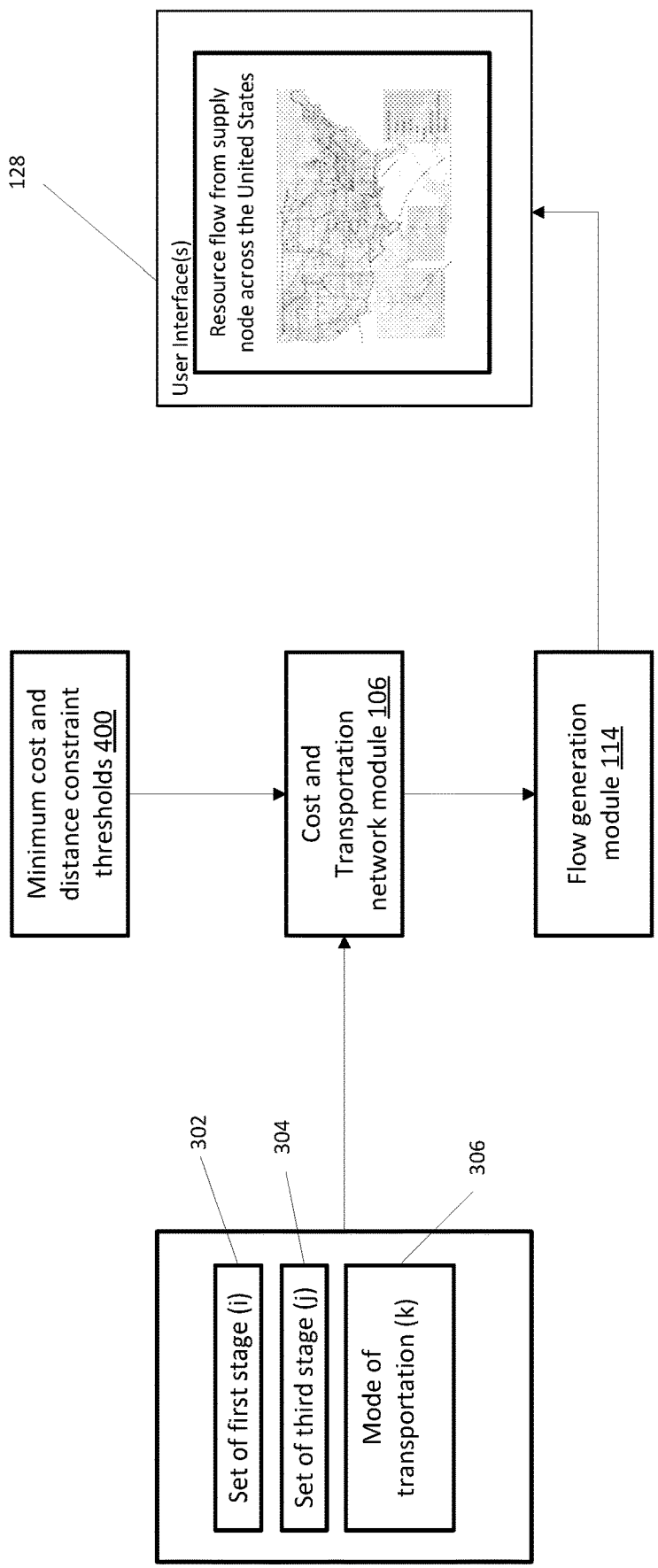
FIG. 5 is a block diagram of an implementation of a system of enabling modeling of flow of resources in a supply chain using a minimum cost and distance constraint thresholds by a cost and transportation module.

Referring to FIG. 4, a block diagram of implementation of a system 300 for modeling flow of resources is shown illustrated at different level of detail. The resource database 126 illustrated in FIG. 2 is configured to provide an input dataset to one or more cost and transportation network modules 106 of the linear optimization model 104. FIG. 3, however, further illustrates the resource database 126 configured to provide input dataset at a different level of details. The input dataset provided by the resource database 126 may include one or more datasets related to the first stage of the supply chain 302, one or more datasets related to the third stage 304 of the supply chain, and one or more datasets related to one or more modes of transportations 306. The cost and transportation network module 106 is used to calculate the distance between the supply nodes 202, 204, 206 of FIG. 3 and the one or more third stages 238, 240, 242 of the supply chain 200. The one or more supply nodes 202, 204, 206 and the one or more third stages 238, 240, 242 of the supply chain 200 are illustrated in FIG. 3. The one or more third stages 238, 240, 242 relates to the demand/consumption for the resources by the end user. The cost and transportation network module 106 is utilizes one or more constraint thresholds for calculating a minimum distance and cost of transporting between the one or more supply nodes 202, 204, 206 and the one or more third stages 238, 240, 242. FIG. 5 illustrates one or more minimum cost and distance constraint thresholds 400 used by the processor 102 and one or more cost and transportation network modules 106 to generate minimum cost and distance between one or more supply nodes 202, 204, 206 and the one or more third stages 238, 240, 242. In reference to both FIG. 4 and FIG. 5, one or more flow generation modules 114 receive the minimum distance and cost to transport resources between the one or more supply nodes 202, 204, 206 to the one or more third stages 238, 240, 242 from the one or more cost and transportation network modules 106. The flow generation module 114 is receives input from the one or more cost and transportation modules 106 to generate reports using one or more user interfaces 128. The reports in various implementations may be represented on the user interfaces 128 graphically in a form of a map showing one or more optimum routes that are binding to the minimum cost and distance constraint thresholds 400 and are shortest and cost effective.

Figure 6:
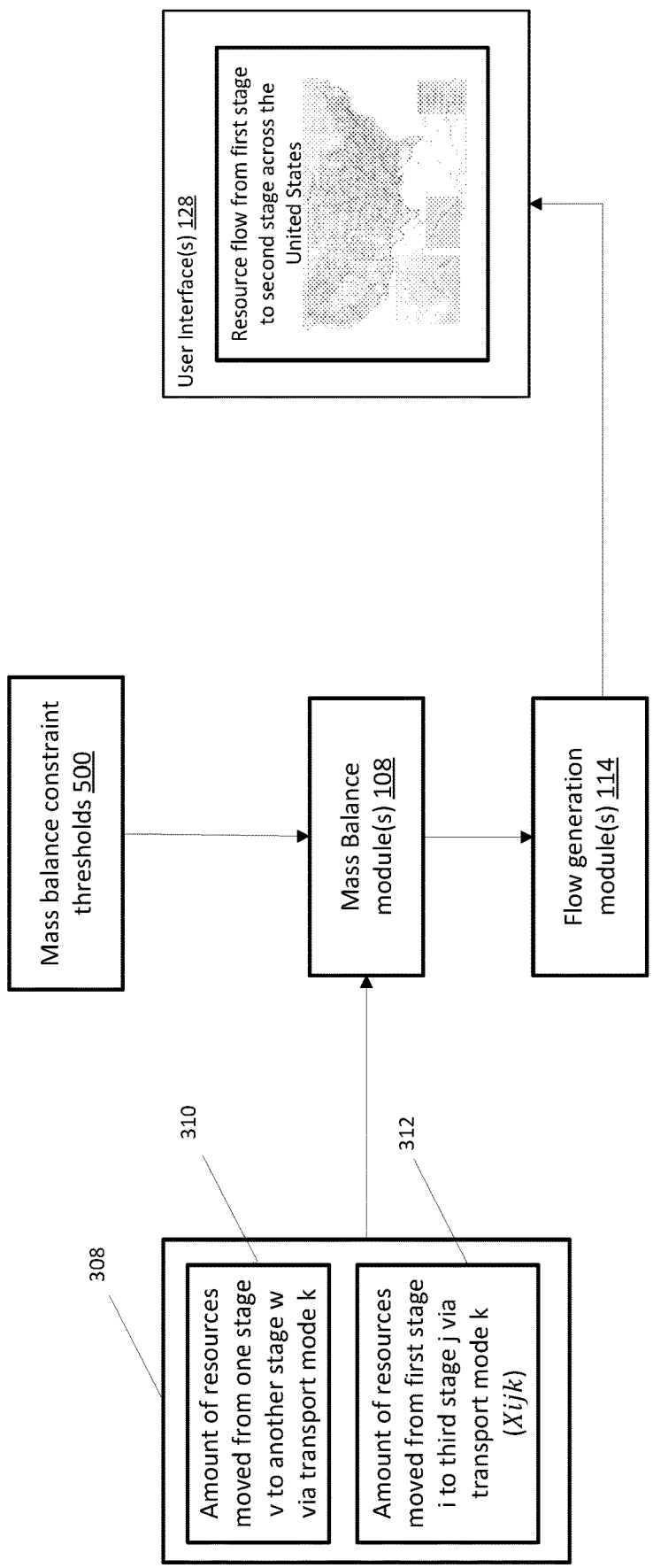
FIG. 6 is a block diagram of an implementation of a system of enabling modeling of flow of resources in a supply chain using mass balance constraint thresholds and a mass balance module.

Referring to FIG. 4 again, the processor 102 and one or more mass balance modules 108 are used to calculate and ensure that the outflows from the one or more first stages 214, 216, 218 of the supply chain 200 are less than equal to supply available at that the one or more first stages 214, 216, 218 of the supply chain and inflows to the one or more third stages 238, 240, 242 are greater than equal to the demand at that one or more third stages 238, 240, v242. FIG. 6 illustrates one or more mass balance constraint thresholds 500 that are used by the processor and the one or more mass balance module(s) 108 to ensure that outflows from one stage are less than equal to the supply available at that stage and inflows to the third stage are greater than or equal to the demand at one or more third stages. The processor 102 and the one or more mass balance module(s) 108 receive one or more input resources 308 related to an amount of resources moved to and from one or more stages 310 and in particular from one or more first stages to the one or more third stages 312. The one or more mass balance module(s) 108 ensure that outflows from one stage are less than or equal to the supply available at that stage and inflows to the third stage are greater than or equal to the demand at that third stage by using the one or more mass balance constraint thresholds 500 on the input resources 308. The one or more flow generation modules 114 receive an output from the one or more mass balance modules 108 for generating reports for the user related to the flow of resources in a supply chain in a form of a map. The reports may be represented on the user interfaces 128 graphically in a form of a map showing one or more optimum routes that are binding to the mass balance constraint thresholds 500.

Figure 7:
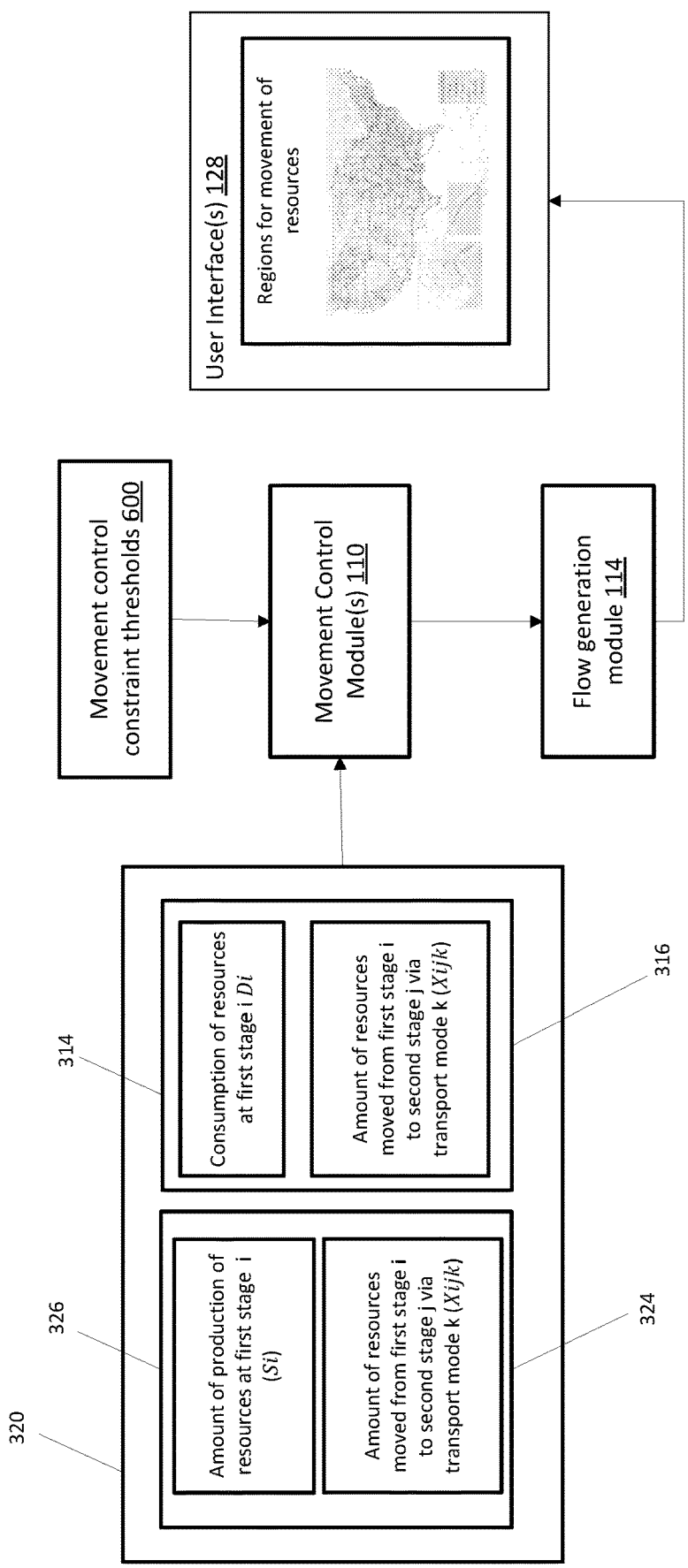
FIG. 7 is a block diagram of an implementation of a system of enabling modeling a flow of resources in a supply chain using one or more movement control constraint thresholds and one or more movement control modules.

Referring to FIG. 4 again, the processor 102 and one or more movement control modules 112 enforce or restrict movement of resources across certain regions. FIG. 7 illustrates the one or more movement control modules 110 using the movement control constraint thresholds 600 on the input from the input resources 320. The one or more movement control modules 110 receive resource information such as an amount of production of resources at first stage 326, consumption of resources at one or more first stages 314, an amount of resources from first stage to second stage via transport 324, and an amount of resources moved from the one or more first stages to one or more second stages via transport mode 316. The transport mode 316 may include pipelines, water, trucks or rail movement or any other transportation mode disclosed in this document. The one or more movement control modules 110 apply the one or more movement control constraint thresholds 600 on the input 320 to generate a result which is then received by the flow generation module 114. The flow generation module 114 uses the input dataset from the one or more movement control modules 110 to generate a graphical representation on the user interface(s) 128 of the flow of the resources bound by the applied movement control constraint thresholds 600.

Figure 8:
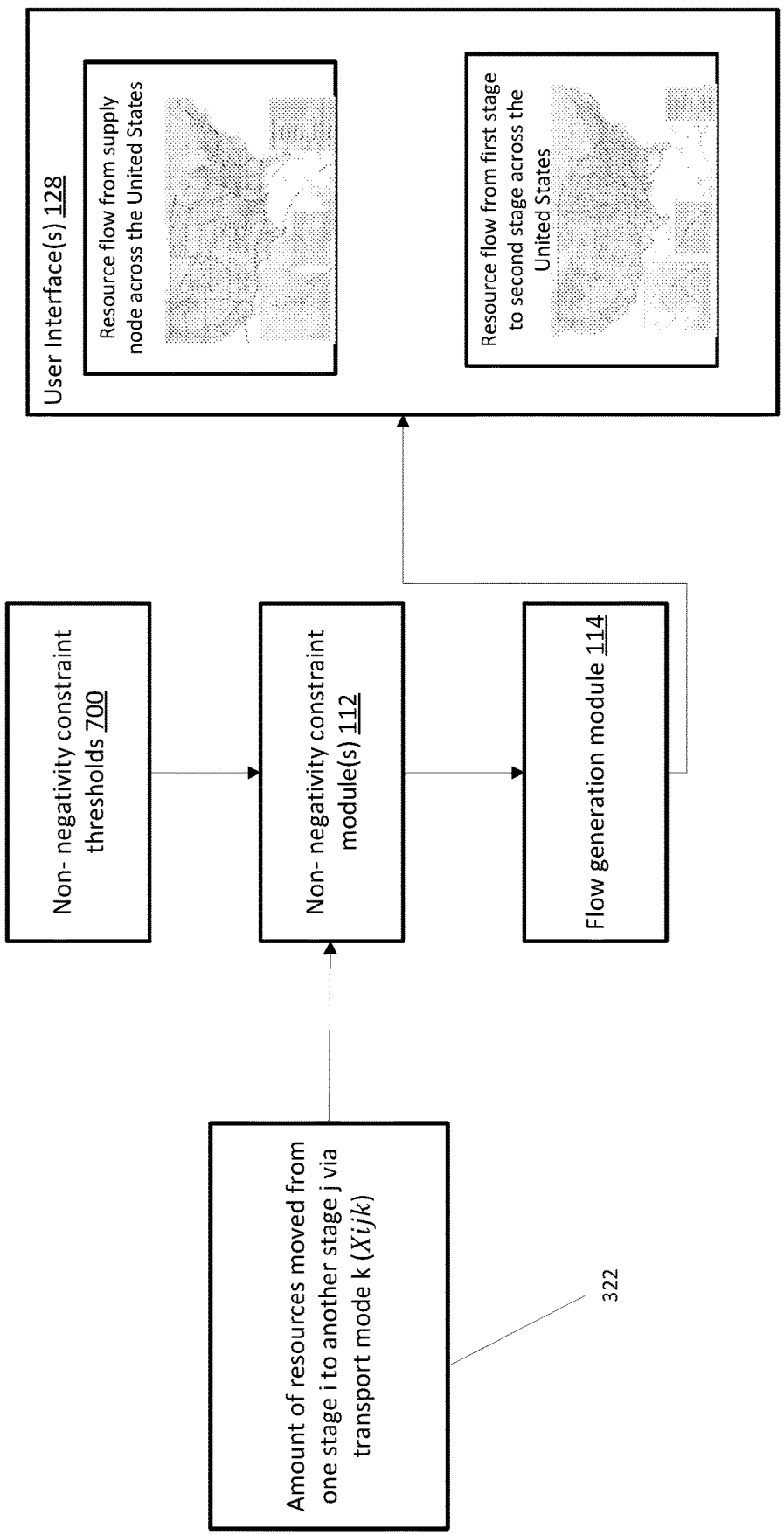
FIG. 8 is a block diagram of an implementation of a system of enabling modeling a flow of resources in a supply chain using one or more non-negativity constraint thresholds and one or more non-negativity modules.

Referring to FIG. 4 again, the processor 102 and the one or more non-negativity constraint modules 112 ensure that a flow of resources in a supply chain 200 exists between different stages of the supply chain 200. FIG. 8 illustrates the use of one or more non-negativity constraint thresholds 700 by the one or more non-negativity constraint modules 112. The one or more non-negativity constraint modules 112 apply the non-negativity constraint thresholds 700 on the input 322 from the input resources and generates an input for the flow generation module 114. The one or more flow generation modules 114 then generate a report displayed on the one or more user interfaces 128 indicating a non-negative flow of resources in the supply chain 200 created using the non-negativity constraint thresholds 700.

In certain implementations, the one or more constraint thresholds 400 may each be binding or tolerant. Various combinations of binding and tolerant constraint thresholds may be employed in various implementations. In various implementation, one or more constraints are binding to provide accurate output for the flow of resources in the supply chain. In yet other implementations, the linear optimization model is run with varying tolerances for the constraint thresholds 400 to compare the change in the overall results of the constraints thresholds. In various implementations, the constraints thresholds have a tolerance of ±0.001%. In other implementations, different tolerance of ±1%, ±5%, ±10%, and ±20% may be used for the constraint thresholds 400.

Referring to FIG. 9, an implementation of a method of enabling a modeling a flow of one or more resources in a supply chain 174 is illustrated. As illustrated, the method includes providing one or more resource databases that include data for one or more resources for modeling flow in the supply chain (step 136). The method also includes generating a first stage resource database from one or more resource databases including data for modeling flow in the supply chain. The purpose of modeling flow in the supply chain to lay a foundation to model the evolution of resource supply chain with its dependencies, critical linkages, and pinch points using the full extent of available public data. The methods of enabling the modeling the flow of one or more resources in a supply chain disclosed herein are based on an linear optimization model. Examples of linear optimization models that may be utilized in the various system and method implementations disclosed herein can be found in the document filed herewith as Appendix A, the disclosure of which is hereby incorporated entirely herein by reference.

As illustrated in FIG. 9, the method includes generating the one or more first stage resource databases are when one or more resources reach one or more first stages of the supply chain from the one or more supply nodes (step 138). The first stage resource database may be the same or different from the one or more resource databases originally provided because the resources may be transformed or combined with other resources when reaching the first stage of the supply chain. As illustrated in FIG. 9, a second stages resource database is generated when the one or more resources reach the one or more second stages of the supply chain from the one or more first stages (step 140). The method also includes generating a third stage resource database when the one or more resources reach the one or more second stages of the supply chain (step 142). The method as illustrated in FIG. 9 uses the linear optimization model previously described to model the flow of resources in the supply chain using actual constraint thresholds and modeling the supply chain with short and/or cost effective routes and binding to each one or more constraint thresholds applied to the input dataset from the resource database.

As illustrated in FIG. 9, the method includes using linear optimization to calculate a minimum distance and a minimum cost between the one or more supply nodes, the one or more first stages, the one or more second stages, the one or more third stages of the supply chain (step 144). In various implementations, this involves minimizing the distance and cost between the one or more supply nodes, the one or more first stages, the one or more second stages, and the one or more third stages. In order to obtain an optimum route for the resource flow in a supply chain, one or more minimum cost and distance constraint thresholds 400 are used in the linear optimization. The method also includes maintaining an outflow from the one or more supply nodes to the one or more first stages to be less than or equal to a supply at the one or more supply nodes and an inflow to the one or more third stages greater than or equal to demand at the one or more third stages using mass balance constraint thresholds which may be any disclosed in this document (step 146). The method also includes enforcing movement of the one or more resources to or from the one or more supply nodes and the one or more first stages, the one or more second stages, or the one or more third stages of the supply chain by using one or more movement constraint thresholds during the linear optimization of the input datasets (step 148). The method steps also includes maintaining a non-negative amount of resources to be transported between the one or more supply nodes and the one or more first stages, the one or more second stages, and the one or more third stages of the supply chain by using a one or more non-negative constraint thresholds during linear optimization (step 150). The method also includes reporting to a user a flow of one or more resources in the supply chain subject to one or more constraints thresholds used during the linear optimization using a one or more computer interfaces. In various implementations, the reports may be visually represented in a form of a map with optimum routes or flow of resources in a supply chain. The one or more constraints thresholds used in the method steps may be binding or tolerant in any combination previously discussed.

Referring to FIG. 10, another implementation of a method for modeling the flow of resources in a supply chain 172 is illustrated. As illustrated, the method includes providing one or more resource database that include data for one or more resources for modeling flow in the supply chain where the supply chain includes one or more supply nodes and or more stages (step 154). The method also includes generating a stage resource database when the resources reach one of the one or more stages from the one or more supply nodes (step 156). The method also includes calculating a minimum distance and a minimum cost between the one or more supply nodes and the one or more stages to enable a modeling of a short and cost effective route in a supply chain and using one or more minimum cost and distance constraint thresholds 400 (step 160). The method also includes maintaining an outflow from the one or more supply nodes less than or equal to a supply at the one or more supply nodes and an inflow to the one or more first stages greater than or equal to demand at the one or more stages using one or mass balance constraints thresholds (step 162). The method includes enforcing or restricting movement of resources of one or more resources to or from one or more supply nodes of the supply chain to the one or more stages using one or more movement control constraint thresholds 600 (step 164). The method also includes maintaining a non-negative amount transported between the one or more supply nodes and the one or more stages of the supply chain using one or more non-negative constraint thresholds (step 168). The method also includes reporting to a user the optimum flow of one or more resources generated using one or more binding or tolerant constraint thresholds in a linear optimization process from the one or more supply nodes to the one or more stages in the supply chain using a one or more computer interfaces (step 170).

Figure 11:
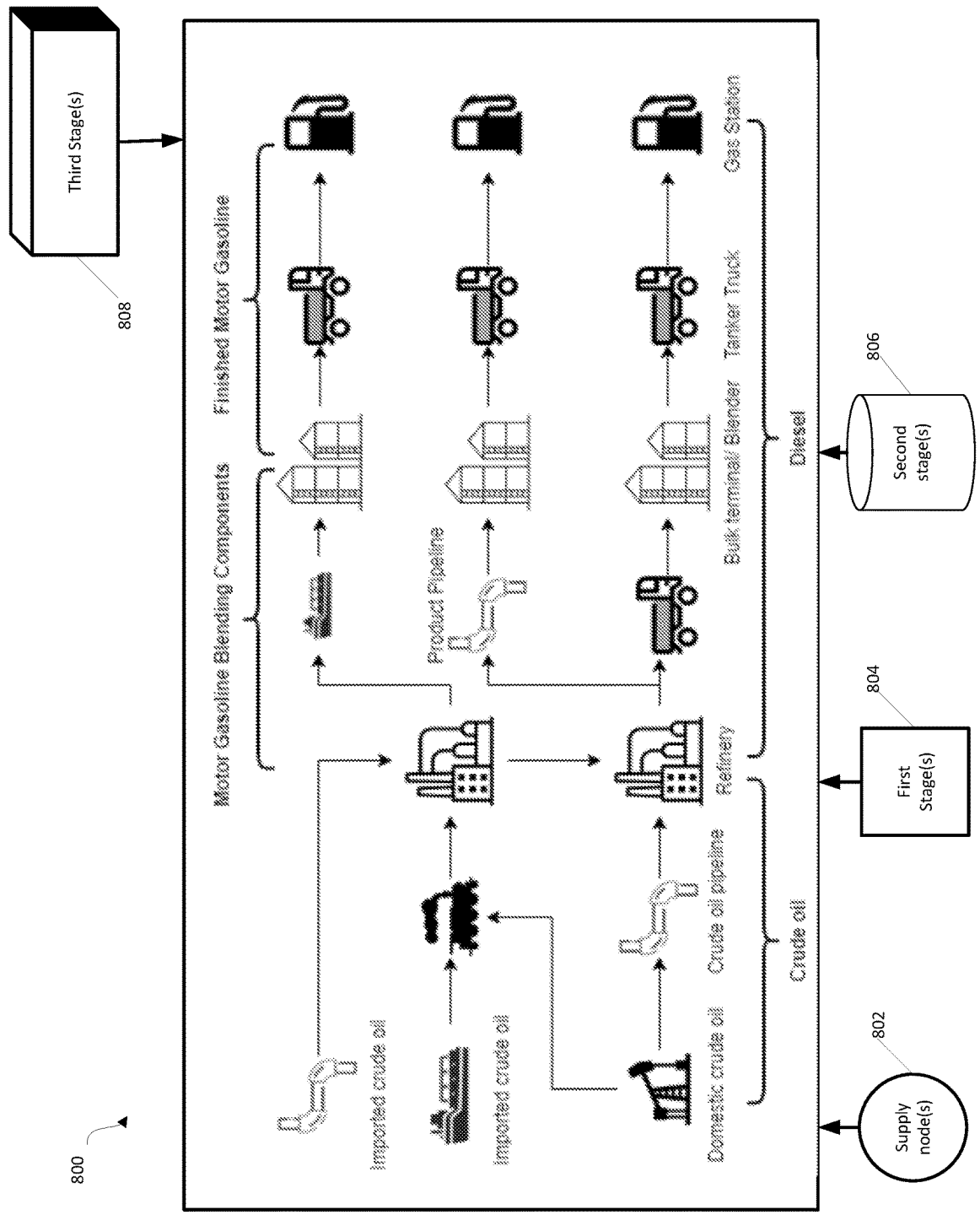
FIG. 11 is a block diagram of an implementation of a gasoline flow in a supply chain.
Figure 12:
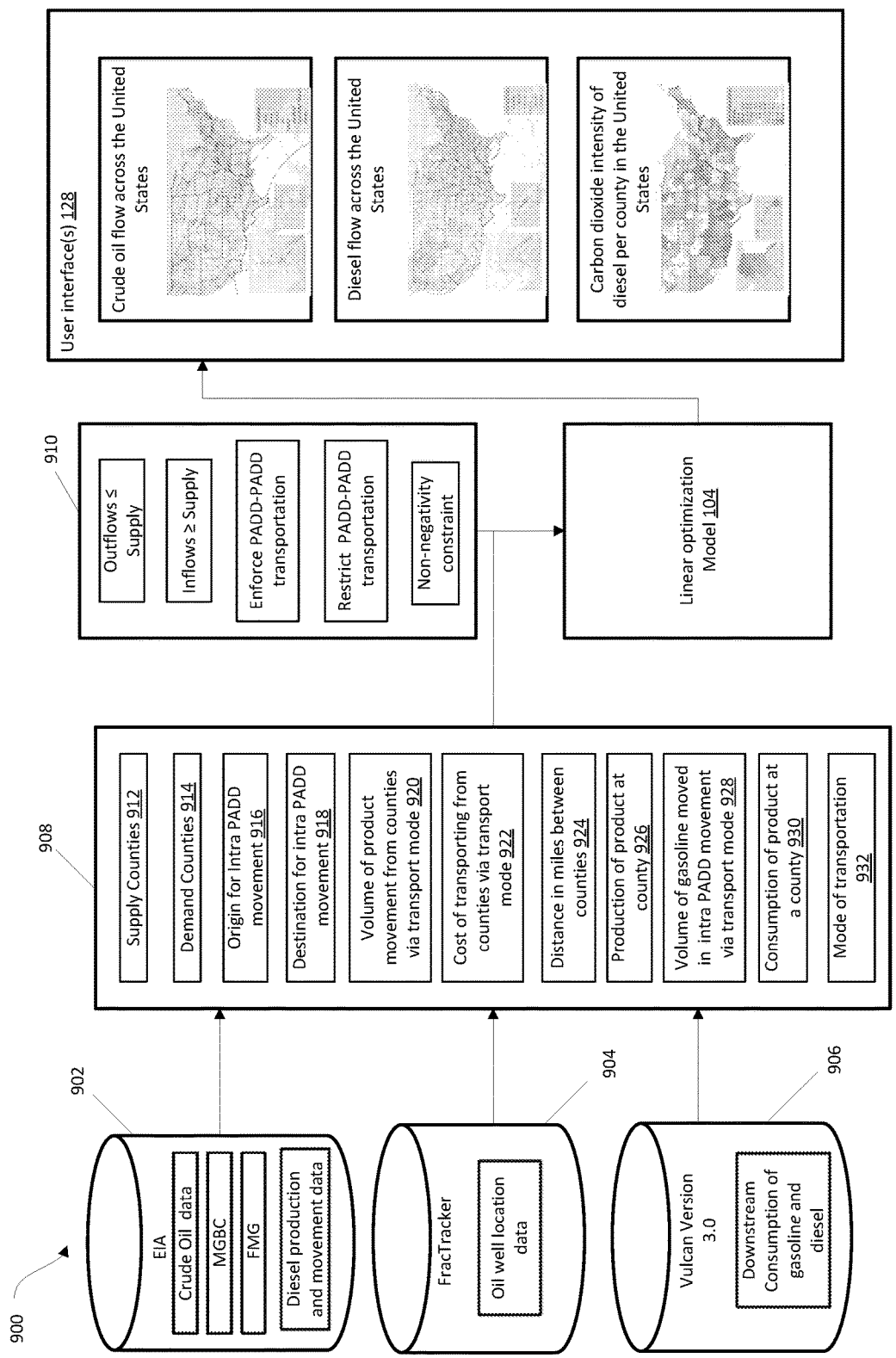
FIG. 12 is a block diagram of an implementation of a system of enabling modeling a flow of gasoline in a supply chain using a linear optimization model.

Referring to FIG. 11, a block diagram of an implementation of flow of gasoline in a supply chain is illustrated. The supply chain as illustrated includes three stages starting from one or more supply nodes including supply node for imported crude oil and domestic crude oil. As illustrated in FIG. 12, from the one or more supply nodes in the supply chain, the imported crude oil and domestic crude oil that relate to one or more raw or unfinished resources reaches one or more first stages which in FIG. 12 are illustrated as one or more refineries. The one or more resources illustrated as crude oil or domestic crude oil is refined and then transported to one or more second stage. The second stage in FIG. 12 may include one or more bulk terminals or blenders. In the one or more second stage the refined crude oil or domestic crude from the one or more refinery is blended in one or more blenders by adding Motor Gasoline Blending components. In other implementations, the one or more refineries transforms the crude oil to diesel which is directly transported to one or more third stages that including one or more gas stations. In yet other implementations the one or more finished motor gasoline products may be formed in one or more second stage by blending MGBC and then transported as finished motor gasoline to the one or more third stages for consumption.

Referring to FIG. 12, a block diagram of an implementation of the system for modeling gasoline resource flow in a supply chain 900 is illustrated. The resource database as illustrated in FIG. 11 includes one or more Energy Information Administration (EIA) databases 902, one or more FracTracker databases 904 and one or more Vulcan version 3.0 databases 906. The plurality of resource databases included in this embodiment relates to gasoline and its flow in the supply chain. The EIA database 902, as illustrated in FIG. 11, includes data related to the crude oil import and domestic production of crude oil data along with input volumes of crude oil to refineries. The EIA database also has annual time series data of motor gasoline blending components (MGBC), finished motor gasoline (FMG), and diesel production along with volumes of these product types moved by pipeline and waterborne tankers/barges at a refining district or Petroleum Administration for Defense (PAD) District spatial level.

The EIA database 902 also has crude oil import and domestic production data along with input of crude oil to refineries. As illustrated in FIG. 12, FracTracker database 904 has oil well location data for oil wells in the United States. The databases EIA 902 and FracTracker 904 illustrated in FIG. 12 relate to data contributed by the one or more supply nodes 802 in FIG. 11. In the embodiment illustrated in FIG. 12, the MGBC production volume serves as the upstream refinery output for the first stage 804 of the supply chain and the FMG production volume serves as the blender output for the second stage 806 of the supply chain. The Vulcan Project Version 3.0 as illustrated in FIG. 12 provides downstream consumption of gasoline and diesel for modeling the flow of gasoline in the supply chain. Referring to FIG. 12 again, the resource databases EIA 902, FracTracker 904, and Vulcan Version 3.0 database 906 provides one or more datasets 908 related to supply counties 912, supply demand counties 914, origin for intra PADD movement 916, destination for intra PADD movement 918, volume of product movement from counties via transport mode 920, cost of transporting from counties via transport mode 922, distance in miles between counties 924, production of product at county 926, volume of gasoline moved in intra PADD movement via transport mode 928, consumption of product at a county 930, and mode of transportation 932. As illustrated in FIG. 12, a linear optimization model like those disclosed herein generates a model of flow of gasoline by applying constraints threshold 910 to the input received from the resource databases EIA 902, FracTracker 904, and Vulcan Version 3.0 database 906. The linear optimization model 104 then is used to calculate and report the results on one or more user interfaces 128 on one or more computing devices associated with one or more users of the system. Additional information regarding the system and method implementations that relate to gasoline and diesel fuel flow, along with methods of calculating emissions from each step and stage of the supply chain are disclosed in Appendix A previously incorporated by reference.

The various emissions modules and emissions-related methods disclosed herein may be any disclosed in Appendix A previously incorporated herein by reference.

The implementations listed here, and many others, will become readily apparent from this disclosure. From this, those of ordinary skill in the art will readily understand the versatility with which this disclosure may be applied. In places where the description above refers to particular implementations of systems and methods for modeling flow of resources in a supply chain and implementing components, sub-components, methods and sub-methods, it should be readily apparent that a number of modifications may be made without departing from the spirit thereof and that these implementations, implementing components, subcomponents, methods and sub-methods may be applied to other systems and methods for systems and methods for modeling flow of resources in a supply chain.

What is claimed is:

1. A method of modeling a flow of one or more resources in a supply chain, the method comprising:
   providing one or more resource databases comprising data for one or more resources for modeling flow in a supply chain wherein the supply chain includes one or more supply nodes, one or more first stages, one or more second stages, and one or more third stages;

generating a first stage resource database when one of the one or more resources reaches one of the one or more first stages of the supply chain from the one or more supply nodes;
generating a second stage resource database when one of the one or more resources reaches one of the one or more second stages of the supply chain from the one or more first stages;
generating a third stage database when one of the one or more resources reaches one of the one or more third stages of the supply chain from the one or more second stages;
using a transportation network model and the one or more resource databases, calculating a minimum distance and a minimum cost between the one or more supply nodes, the one or more first stages, the one or more second stages, and the one or more third stages of the supply chain;
using a mass balance model and the one or more resource databases, maintaining an outflow from the one or more supply nodes to the one or more first stages less than or equal to a supply at the one or more supply nodes and an inflow to the one or more third stages greater than or equal to demand at the one or more third stages;
using a movement control model and the one or more resource databases, enforcing movement of the one or more resources to or from the one or more supply nodes and the one or more first stages, the one or more second stages, or the one or more third stages of the supply chain;
using a non-negativity constraint model and the one or more resource databases, maintaining a non-negative amount to be transported between the one or more supply nodes and the one or more first stages, the one or more second stages, and the one or more third stages of the supply chain; and
using a flow generation model and one or more constraint thresholds, reporting to a user a flow of the one or more resources in the supply chain using one or more computer interfaces generated by a computing device associated with the user.

2. The method of claim 1, wherein a state of the one or more resources in the first stage may be different from a state of the one or more resources in the second stage or in the third stage.

3. The method of claim 1, wherein the one or more constraint thresholds may include one of a non-negativity constraint threshold, an outflow constraint threshold, a type of transportation constraint threshold, a minimum distance constraint threshold between supply and demand, a transportation cost threshold, or any combination thereof.

4. The method of claim 1, wherein the movement control model may generate a type of transportation constraint threshold.

5. The method of claim 1, wherein the one or more constraint thresholds are binding constraints.

6. The method of claim 1, wherein the one or more constraint thresholds are generated by the movement control model and the one or more constraint thresholds generated by the movement control model may include a tolerance of one of ±0.001%, ±1%, ±5%, ±10%, or ±20%.

7. A method of modeling a flow of one or more resources in a supply chain, the method comprising:
providing one or more resource databases comprising data for one or more resources for modeling flow in the supply chain wherein the supply chain includes one or more supply nodes and one or more stages;
generating a stage resource database when the one or more resources reach one of the one or more stages from the one or more supply nodes;
using a transportation network model and the one or more resource databases, calculating a minimum distance and a minimum cost between the one or more supply nodes and the one or more stages;
using a mass balance model and the one or more resource databases, maintaining an outflow from the one or more supply nodes less than or equal to a supply at the one or more supply nodes and an inflow to the one or more stages greater than or equal to demand at the one or more stages;
using a movement control model and the one or more resource databases, enforcing movement of the one or more resources to or from one or more supply nodes of the supply chain to the one or more stages;
using a non-negativity constraint model and the one or more resource databases, maintain a non-negative amount to be transported between the one or more supply nodes and the one or more stages of the supply chain; and
using a flow generation model and one or more constraint thresholds, reporting to a user the flow of the one or more resources from the one or more supply nodes to the one or more stages in the supply chain using one or more computer interfaces generated by a computing device associated with the user.

8. The method of claim 7, wherein a state of the one or more resources in the one or more stages may be different from a state in at least one of the one or more stages.

9. The method of claim 7, wherein the one or more constraint thresholds may include one of a non-negativity constraint threshold, an outflow constraint threshold, a type of transportation constraint threshold, a minimum distance constraint threshold between supply and demand, a transportation cost threshold, or any combination thereof.

10. The method of claim 7, wherein the movement control model may generate a type of transportation constraint threshold.

11. The method of claim 7, wherein the one or more constraint thresholds are binding constraints.

12. The method of claim 7, wherein the one or more constraint thresholds are generated by the movement control model and the one or more constraint thresholds generated by the movement control model may include a tolerance of one of ±0.001%, ±1%, ±5%, ±10%, or ±20%.

13. A system for modeling a flow of one or more resources in a supply chain, the system comprising:
one or more processors configured to execute:
a transportation network model and one or more resource databases configured to calculate a minimum distance and a minimum cost between one or more supply nodes and one or more first stages of a supply chain;
a mass balance model configured to maintain an outflow from the one or more first stages less than or equal to a supply available at the one or more first stages and an inflow to one or more second stages greater than or equal to demand at the one or more second stages;
a movement control model configured to enforce movement of resources to or from the one or more supply nodes to the one or more first stages;
a non-negativity constraint model configured to maintain a non-negative volume to be transported between the one or more supply nodes and the one or more first stages of the supply chain; and a flow generation model and one or more constraint thresholds configured to report to a user the flow of one or more resources and emissions from the flow of the one or more resources in the supply chain using one or more computer interfaces generated by a computing device associated with a user.

14. The system of claim 13, wherein a state of the one or more resources in the one or more first stages may be different than a state of the one or more resources in the one or more second stages.

15. The system of claim 13, wherein the one or more constraint thresholds may include one of a non-negativity constraint threshold, an outflow constraint threshold, a type of transportation constraint threshold, a minimum distance constraint threshold between supply and demand, a transportation cost threshold, and any combination thereof.

16. The system of claim 13, wherein the movement control model may generate a type of transportation constraint threshold.

17. The system of claim 13, wherein the one or more constraint thresholds are binding constraints.

18. The system of claim 13, wherein the movement control model generates one or more constraint thresholds with a tolerance of one of ±0.001%, ±1%, ±5%, ±10%, or ±20%.

19. The system of claim 13, wherein the flow generation model reports emissions from transporting the one or more resources along each of the one or more first stages and each of the one or more second stages and the emissions from a specific amount of the one or more resources when the one or more resources are transformed at the one or more first stages, the one or more second stages, or both the one or more first stages and the one or more second stages.

20. The system of claim 13, wherein the flow generation model reports emissions from the one or more first stages, the one or more second stages, and one or more third stages of the supply chain.

* * * * *